US008407746B2

(12) United States Patent
Casey et al.

(10) Patent No.: US 8,407,746 B2
(45) Date of Patent: Mar. 26, 2013

(54) WIRELESS DIGITAL VIDEO RECORDERS—CONTENT SHARING SYSTEMS AND METHODS

(75) Inventors: Steven M. Casey, Littleton, CO (US); Gnana Selvadurai, Lafayette, CO (US); Angela Mitchell, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 565 days.

(21) Appl. No.: 11/434,729

(22) Filed: May 15, 2006

(65) Prior Publication Data

US 2006/0218598 A1 Sep. 28, 2006

Related U.S. Application Data

(63) Continuation-in-part of application No. 11/060,224, filed on Feb. 16, 2005.

(51) Int. Cl.
*H04N 7/18* (2006.01)
(52) U.S. Cl. .......................................... 725/74; 709/227
(58) Field of Classification Search .................. 725/142, 725/74
See application file for complete search history.

(56) References Cited

U.S. PATENT DOCUMENTS

| | | | |
|---|---|---|---|
| 5,528,285 A | 6/1996 | Morikawa et al. | |
| 5,557,541 A | 9/1996 | Schulhof et al. | |
| 5,572,442 A | 11/1996 | Schulhof et al. | |
| 5,812,790 A | 9/1998 | Randall | |
| 5,864,591 A * | 1/1999 | Holcombe | 375/345 |
| 5,887,243 A | 3/1999 | Harvey et al. | |
| 5,991,596 A | 11/1999 | Cunningham et al. | |
| 6,163,691 A | 12/2000 | Buettner et al. | |
| 6,192,340 B1 | 2/2001 | Abecassis | |
| 6,256,691 B1 | 7/2001 | Moroz et al. | |
| 6,330,462 B1 | 12/2001 | Chen | |
| 6,341,133 B1 | 1/2002 | Kawamoto et al. | |
| 6,532,593 B1 | 3/2003 | Moroney | |
| 6,556,217 B1 | 4/2003 | Makipaa et al. | |
| 6,574,793 B1 * | 6/2003 | Ngo et al. | 725/32 |
| 6,658,268 B1 | 12/2003 | Bodnar et al. | |
| 6,741,684 B2 | 5/2004 | Kaars | |
| 6,922,567 B1 | 7/2005 | Rydbeck | |
| 6,931,257 B2 | 8/2005 | Shahidi et al. | |
| 6,941,154 B1 | 9/2005 | Ritter | |
| 6,947,758 B2 | 9/2005 | Nguyen | |
| 6,950,624 B2 | 9/2005 | Kim et al. | |
| 6,959,260 B2 | 10/2005 | Rodman et al. | |
| 6,981,045 B1 * | 12/2005 | Brooks | 709/226 |
| 7,016,643 B1 | 3/2006 | Kuether et al. | |
| 7,165,725 B2 | 1/2007 | Casey | |
| 7,209,900 B2 | 4/2007 | Hunter et al. | |

(Continued)

FOREIGN PATENT DOCUMENTS

EP 793164 9/1997

OTHER PUBLICATIONS

RFC 793, Transmission Control Protocol, USC Information Sciences Institute, Sep. 1981.*

(Continued)

*Primary Examiner* — Robert Hance
(74) *Attorney, Agent, or Firm* — Swanson & Bratschun, L.L.C.

(57) ABSTRACT

Embodiments of the present invention provide methods for distributing media content between portable media devices with digital rights management protections. Offering several applications in the technical arts, embodiments of the present invention provide methods for managing distribution of media content between portable media devices. Further, embodiments of the present invention provide methods for easy and effective transmission of media content between portable media devices.

29 Claims, 3 Drawing Sheets

U.S. PATENT DOCUMENTS

| | | | |
|---|---|---|---|
| 7,212,729 | B2 | 5/2007 | Nakajima et al. |
| 7,346,549 | B2 | 3/2008 | Deas et al. |
| 7,377,440 | B2 | 5/2008 | Casey |
| 7,654,462 | B2 | 2/2010 | Casey |
| 2001/0003195 | A1 | 6/2001 | Kajimoto |
| 2002/0032489 | A1* | 3/2002 | Tynan et al. ............... 700/1 |
| 2002/0049760 | A1* | 4/2002 | Scott et al. ............... 707/10 |
| 2002/0157101 | A1 | 10/2002 | Schrader et al. |
| 2002/0188735 | A1* | 12/2002 | Needham et al. ........... 709/229 |
| 2003/0028610 | A1* | 2/2003 | Pearson ................. 709/213 |
| 2003/0050062 | A1 | 3/2003 | Chen et al. |
| 2003/0074661 | A1* | 4/2003 | Krapf et al. ............... 725/34 |
| 2003/0081934 | A1 | 5/2003 | Kirmuss |
| 2003/0163697 | A1* | 8/2003 | Pabla et al. .............. 713/171 |
| 2004/0024688 | A1* | 2/2004 | Bi et al. ................ 705/37 |
| 2004/0030651 | A1* | 2/2004 | Kim et al. ............... 705/51 |
| 2004/0052504 | A1 | 3/2004 | Yamada et al. |
| 2004/0111756 | A1 | 6/2004 | Stuckman et al. |
| 2004/0117845 | A1* | 6/2004 | Karaoguz et al. ........... 725/134 |
| 2004/0204145 | A1 | 10/2004 | Nagatomo |
| 2004/0266336 | A1 | 12/2004 | Patsiokas et al. |
| 2005/0068417 | A1 | 3/2005 | Kreiner et al. |
| 2005/0102148 | A1 | 5/2005 | Rogitz |
| 2005/0122435 | A1 | 6/2005 | Yunoki |
| 2005/0144019 | A1* | 6/2005 | Murakami et al. ............. 705/1 |
| 2005/0149564 | A1 | 7/2005 | Jain et al. |
| 2005/0232284 | A1 | 10/2005 | Karaoguz et al. |
| 2005/0289604 | A1 | 12/2005 | Byers |
| 2005/0289630 | A1 | 12/2005 | Andrews et al. |
| 2006/0101116 | A1 | 5/2006 | Rittman et al. |
| 2006/0184975 | A1 | 8/2006 | Casey |
| 2006/0184983 | A1 | 8/2006 | Casey |
| 2007/0168429 | A1* | 7/2007 | Apfel et al. ............. 709/206 |

OTHER PUBLICATIONS www.dynamism.com/MSV-A1/, "Sony MSV-A1—Portable TV", Jul. 20, 2004.

Franklin, Jamara Alazaida, "Notice of Allowance in U.S. Appl. No. 11/060,222", Nov. 17, 2006, Publisher: USPTO, Published in: USA.

Jamara A. Franklin, "Jan. 24, 2006 Office Action in U.S. Appl. No. 11/060,222 Application", Jan. 24, 2006, Publisher: USPTO, Published in: USA.

Franklin, Jamara Alzaida, "Oct. 19, 2005 Office Action in U.S. Appl. No. 11/060,222", Oct. 19, 2005, Publisher: USPTO, Published in: USA.

Franklin, Jamara Alzaida, "Jun. 15, 2006 Office Action in U.S. Appl. No. 11/060,222 application", Jan. 24, 2006, Publisher: USPTO, Published in: USA.

Ron Richter, "Television is coming to a cell phone near your", Jul. 20, 2004, Publisher: http://pd.pennnet.com/Articles/Article_display.cfm?Section=Articless&Subsection=Display&ARTICLE_ID.

www.icube.us/sony_msv-a1/product_overview.htm, "Portable TV & MPEG4 video recorder", Jul. 20, 2004.

www.xvxonline.com/xfiles/about_mpg.htm, "About MPG, MPEG-4", Oct. 28, 2004.

U.S. Appl. No. 11/060,224, Office Action dated Nov. 3, 2010, 38 pgs.

U.S. Appl. No. 11/060,219, Final Office Action dated Nov. 9, 2010, 48 pgs.

U.S. Appl. No. 11/060,224, Office Action dated Feb. 24, 2009, 45 pgs.

U.S. Appl. No. 11/060,224, Office Action dated Jul. 6, 2009, 33 pgs.

U.S. Appl. No. 11/060,224, Office Action dated Jan. 22, 2010, 41 pgs.

U.S. Appl. No. 11/060,224, Office Action dated Jul. 7, 2010, 38 pgs.

U.S. Appl. No. 11/060,633, Office Action dated Sep. 25, 2007, 8 pgs.

U.S. Appl. No. 11/060,633, Notice of Allowance dated Feb. 13, 2008, 6 pgs.

U.S. Appl. No. 11/292,210, Office Action dated Apr. 17, 2008, 11 pgs.

U.S. Appl. No. 11/292,210, Final Office Action dated Nov. 4, 2008, 11 pags.

U.S. Appl. No. 11/292,210, Office Action dated Apr. 15, 2009, 14 pgs.

U.S. Appl. No. 11/292,210, Notice of Allowance dated Oct. 13, 2009, 7 pgs.

U.S. Appl. No. 11/060,219, Office Action dated Aug. 21, 2008, 21 pgs.

U.S. Appl. No. 11/060,219, Office Action dated Feb. 23, 2009, 46 pgs.

U.S. Appl. No. 11/060,219, Office Action dated Jul. 7, 2009, 28 pgs.

U.S. Appl. No. 11/060,219, Final Rejection dated Feb. 24, 2010, 41 pgs.

U.S. Appl. No. 11/060,219, Office Action dated May 13, 2010, 39 pgs.

U.S. Appl. No. 11/060,224, Office Action dated Aug. 19, 2008, 39 pgs.

U.S. Appl. No. 11/060,219, Office Action dated Mar. 17, 2011, 46 pgs.

U.S. Appl. No. 11/060,224, Final Office Action dated Mar. 15, 2011, 40 pgs.

U.S. Appl. No. 11/060,219; Final Office Action Jul. 27, 2011; 47 pages.

U.S. Appl. No. 11/060,224; Notice of Panel Decision dated Jul. 19, 2011; 2 pages.

* cited by examiner

WIRELESS DIGITAL VIDEO RECORDERS—CONTENT SHARING SYSTEMS AND METHODS

CROSS-REFERENCES TO RELATED APPLICATIONS

This application is a continuation-in-part of U.S. application Ser. No. 11/060,224, entitled WIRELESS DIGITAL VIDEO RECORDER filed Feb. 16, 2005, the complete disclosure of which is incorporated herein by reference.

This application is related to U.S. application Ser. No. 11/060,222, filed Feb. 16, 2005 by Steven M. Casey and entitled "MOBILE DEVICE BASE STATION FOR ENHANCED SIGNAL STRENGTH FOR MEDIA SERVICES", the disclosure of which is incorporated herein by reference for all purposes. This application is also related to U.S. application Ser. No. 11/060,633, filed Feb. 16, 2005 by Steven M. Casey and entitled "MEDIA SERVICES MANAGER FOR BASE STATION", the disclosure of which is incorporated herein by reference for all purposes. This application is further related to U.S. application Ser. No. 11/060,219, filed Feb. 16, 2005 by Steven M. Casey and entitled "WIRELESS DIGITAL VIDEO RECORDER MANAGER", the disclosure of which is incorporated herein by reference for all purposes.

This application is further related to the following commonly-owned, applications (the "NPVR Applications"), of which the entire disclosure of each is incorporated herein by reference: U.S. patent application Ser. No. 11/291,326, filed on a date even herewith by Casey et al. and entitled "Network-Based Format Conversion"; U.S. patent application Ser. No. 11/291,806, filed on a date even herewith by Casey et al. and entitled "Networked Content Storage"; and U.S. patent application Ser. No. 11/291,325, filed on a date even herewith by Casey et al. and entitled "Personal Broadcast Channels"; and U.S. patent application Ser. No. 11/291,324, filed on a date even herewith by Casey et al. and entitled "Networked Personal Video Recorder System and Methods".

BACKGROUND OF THE INVENTION

The present invention relates generally to the field of distributing media content for use on portable media devices. More specifically, embodiments of the present invention provide methods and systems for distributing media content between portable media devices.

In recent years, with advances in media technology, in particular the developments in digital electronics, more and more mobile media devices are being produced. In particular, wireless phones are now capable of many media functions are being produced in large volumes. Consequently, it is more and more likely that media content will increasingly be viewed on portable media devices, rather than personal computers. These new portable media devices will be either new products, such as email readers and Internet radios, or existing products with new features, such as wireless phones with media capabilities (as discussed previously), MP3 players, personal digital assistants ("PDAs"), and the like. The success of all these new portable media devices will depend upon the ability to effectively provide desirable media content to the media user that is interesting and of a quality so that the user does not use a less mobile media device, such as a standard personal computer, to access the content. With regard to effective access to media content, it is highly desirable for users to be able to easily select and receive media content for their portable media devices where the reception must be of a high standard.

As such, there now exists in the marketplace a need for effectively providing the new portable media devices with media content. Currently, media content is, in general, provided to users on memory cards or the like on which the media content is stored. The memory cards storing the media content may be purchased by users of the portable media devices or the users may record content to memory cards for use on their portable media devices using their personal computer and/or other recording device. These methods of obtaining media content, however, either limit the wireless phone user to the media content that is available on pre-recorded memory cards or requires the user to have the knowledge and accessories to access content providers and to record media content to a memory card.

As an alternative to the use of memory cards, portable media devices may be adapted to directly receive media content through television tuners, satellite radio receivers, and the like. However, with mobile type devices, the reception of media content signals may be compromised by the mobility of the mobile media device due to, among other things, signal reception. Additionally, power usage and the ability of the device to contemporaneously receive and manage video content from multiple sources are problems existing in the art. Further, multiple sources of media content exist that a user of a portable media device must connect to and access to download media content.

As well as issues concerning the downloading/uploading/reception of media content by portable devices there is also a trend wherein consumers desire to share media content with other consumers. For example, a typical consumer may have media content on his or her portable that he or she may wish to quickly and easily transfer to another consumer's portable media device. Sharing of media content between portable media devices may be desirable for discussion purposes, when consumers are traveling together, so that a consumer may pass media content created or edited by the consumer, and/or the like.

Currently, issues may exist—such as digital rights management, media content transfer limitations, etc.—that limit the ability of consumers to effectively share media content between portable media devices. These issues may be caused by a loss of protection of the rights of a content provider when media content is distributed between portable media devices. Additionally, connections and communication between portable media devices may be troublesome. Furthermore, effective management and control of distribution of media content between portable media devices may not be possible.

BRIEF SUMMARY OF THE INVENTION

Embodiments of the present invention solve at least the problems discussed above by providing a method for distributing media content between portable media devices. Offering several applications in the technical arts, embodiments of the present invention provide methods for managing distribution of media content between portable media devices. Further, embodiments of the present invention provide methods for easy and effective transmission of media content between portable media devices.

Some embodiments of the present invention relate to methods for receiving, storing and/or managing the distribution of media content between wireless phones with media capabilities. In certain embodiment of the present invention, incentives are provided to consumers for distributing media content. In some embodiments of the present invention, media content may be interlaced with advertising prior to entry into distribution channels. In certain aspects, data may be obtained during the distribution of the media content and this data may be provided to the content provider. The media content distribution may be managed to provide for accurate transmission between portable devices.

BRIEF DESCRIPTION OF THE DRAWINGS

The present disclosure is described in conjunction with the appended figures.

Figure 1:
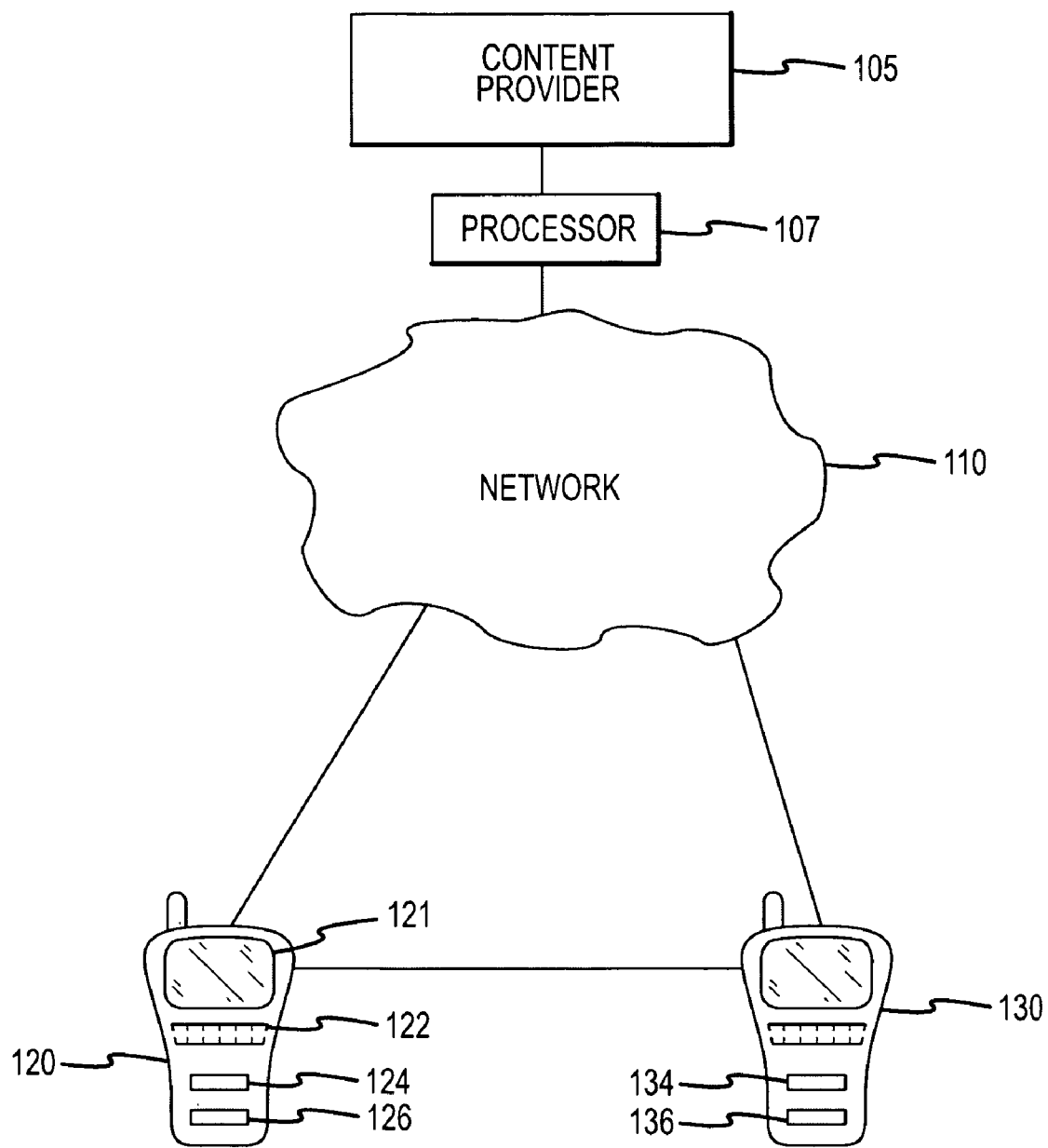
FIG. 1 is a functional diagram illustrating an embodiment for providing on-demand media content services to a base station for use with a portable media device, in accordance with an embodiment of the present invention.

In the appended figures, similar components and/or features may have the same reference label.

DETAILED DESCRIPTION OF THE INVENTION

The ensuing description provides preferred exemplary embodiment(s) only and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but the process could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, for the purposes of explanation, specific details are set forth in order to provide a thorough understanding of the invention. However, it will be apparent that the invention may be practiced without these specific details.

Merely by way of example, FIG. 1 schematically illustrates a method for distributing media content from a content provider between portable media devices. A consumer may obtain media content for a portable media device 120 from a media content provider 110. In some embodiments, there may be one or more media content providers 110, which may be television studios and/or broadcasters, radio broadcasters, motion picture studios, data providers, providers of streaming videos, gaming providers, marketing companies etc. Depending on the embodiments, the media content provider 110 may be any entity that provides media content (in any suitable form) that may be provided on demand to a subscriber. In certain embodiments, one or more of the content provider(s) 110 may have agreements with a service provider to provide on-demand content for distribution to subscribers. Such agreements may provide for: (a) per-viewing fees payable from the service provider to the content provider; (b) the insertion of advertisements (by the service provider, the content provider and/or a third-party) into on-demand content provided to subscribers; (c) restrictions upon how the content may be provided (e.g., viewing windows during which certain content may or may not be provided, terms governing the provision of on-demand content, etc.); (d) terms related to digital rights management; (e) terms related to the tracking of content provided to subscribers; (e) subscriber feedback to provided media content; and/or (e) other terms regarding supply/distribution of on-demand content. In other embodiments, the subscribers may be able to directly access the content providers and arrange terms and conditions with the content providers for receiving media content on-demand.

Systems and methods for obtaining media content for a portable media device from a content provider are described in the following applications: (a) U.S. application Ser. No. 11/292,210, filed on a date even herewith by Casey and entitled "MOBILE DEVICE BASE STATION FOR ENHANCED SIGNAL STRENGTH FOR MEDIA SERVICES" (b) U.S. application Ser. No. 11/060,222 entitled "MOBILE DEVICE BASE STATION FOR ENHANCED SIGNAL STRENGTH FOR MEDIA SERVICES"; and (c) U.S. application Ser. No. 11/060,633 entitled "MEDIA SER- VICES MANAGER FOR BASE STATION", the disclosures of which are incorporated by reference herein for all purposes. The NPVR Applications also describe in detail how both on-demand and real-time content can be provided to a variety of subscriber devices, including without limitation the portable media devices of various embodiments of the invention. As discussed in more detail in the previously listed applications the portable mobile device 120 may communicate with the content provider via a network 110. The network 110 may be any of several different types of communication networks. Merely by way of example, the network 110 may be the Internet. In other embodiments, the network 110 may be a telecommunication provider's network, including for example, an asynchronous transfer mode ("ATM") network, a time-division multiplexed ("TDM") network, a wireless network (including, for instance, cellular networks, personal communication service ("PCS") networks, 802.11 networks, and the like), and/or a cable television distribution network. In many cases, the network 110 may be a composite of a plurality of these (and other) types of networks. In short, the network 105 may be any public or private network capable of transporting media content (e.g., video, audio, data, etc.). In some cases, the network 110 may be capable of transmitting packeted data, for instance, data formatted according to the TCP/IP suite of protocols.

The content provider 105 may directly communicate with the portable media device 120 or may communicate with the portable media device 120 through a secondary device designed for receiving and/or storing media content, such as a base station (not shown). A user of the portable media device 120 may request delivery of media content from the content provider. In some embodiments of the present invention, a content processor 107 may provide for the management/processing of delivery of media content to the portable media device 120. In some embodiments, the user of the portable media device 120 may establish an account with the content provider 105 and information regarding the account may be stored in a memory associated with the processor 107.

In certain embodiments of the present invention, the content provider 105 may seek to have its media content actively distributed between portable media devices by providing a payment scheme to consumers that distribute the media content. In such embodiments, the media content may contain advertising, product placements, etc. Further, the content processor 107 may use information provided by the user of the portable media device 120 downloading the media content to adjust the marketing content associated with the media content. The content provider may also seek to remunerate consumers for distributing media content to provide that the media content is distributed with all digital rights management tools/registrations etc. intact.

In certain embodiments of the present invention, the portable media device 120 may include a display screen 121 and/or an operational interface 122, such as a keyboard, touch-screen and/or the like. Using the operational interface 122 and/or the display screen 121, the user may select media content stored on the portable media device for distribution to a second portable media device 130. (It should be noted that there may be a plurality of additional portable media devices 130 to which content is transferred. It should also be noted that a single user might own and/or possess both portable media devices 120 and 130, and/or a first user might own and/or possess the first device 120, while a second user might own and/or possess the second device 130). Once selected, a transmission processor 124 may process the media content for transmission. Processing may involve formatting the media content into the correct format for transmission to the second portable media device 130, compression of the media content, application of (and/or maintenance of existing) digital rights management controls to the media content, application of a signature identifying the content provider 105 and/or the portable media device 120 and/or the like. Hence, embodiments of the invention can be configured various digital rights management and/or anti-piracy mechanisms. Merely by way of example, the device 120 might be configured to ensure that, when content is to be transferred to the second device 130, any anti-piracy mechanisms associated with the content are transmitted with the content (and, as one skilled in the art will appreciate, might in fact be integrated with the content itself). Moreover, in certain embodiments, the transmission processor may not allow the media content to be transmitted until a code/signature etc. has been received from the second portable media device 130 identifying that the second portable media device has clearance from the content provider 105 or an associated party to receive the media content. (As described in the NPVR Applications, personal broadcast channels ("PBC") can be used to order and/or share content. Such PBCs may be used as one vehicle to share content among portable media devices in accordance with various embodiments of the invention.)

In some embodiments, the user of the second portable media device 130 may register and/or pay a fee to the content provider 105 to provide for receiving media content that the content provider 105 has rights in from other portable media devices and/or directly from the content provider 105. Various payment methods may be used, such as periodic payments, per transaction payments, debit accounts, and/or the like. In certain aspects, the user of the second portable media device 130 may simply register with the content provider 105 and provide certain information in order to be able to receiver the content provider's 105 media content.

In a set of embodiments, the media content may be transmitted by a transmitter 126 associated with the portable media device and/or received by a receiver 136 associated with the second portable media device 130. The transmitter 126 and the receiver 136 may be WiFi devices, WiMax devices, Bluetooth devices, infrared devices, and/or the like and may provide for the wireless communication of the media content from the portable media device 120 to the second portable media device 130. In alternative embodiments, a wired connection may be created between the portable media device 120 and the second portable media device 130 and may provide for the communication of the media content.

A reception processor 134 associated with the second portable media device 130 may provide for the processing of the media content, and/or a user of the second portable media device 130 may use a user interface and/or a display screen associated with the second portable media device 130 to control/view the media content. Prior to the communication of the media content from the portable media device 120 to the second portable media device 130, the portable media device 120 may require confirmation that the second portable media device 130 is authorized to receive and/or use the media content. In certain embodiments of the present invention, the reception processor 134 may create an electronic record of the reception of the media content by the second portable media device 130 and/or may send the electronic record to the portable media device 120. The electronic record may include a reference identifying the media content and/or a signature identifying the second portable media device 130. The portable media device 120 (and/or a user thereof) may send a second electronic record (which might comprise the first electronic record) to the content processor 107 to identify the distribution of the media content from the portable media device 120 and the second portable media device 130 and/or to request authorization to transfer the content. In other embodiments, the second portable media device 130 may transmit the electronic record over the network 110 to the content processor 107 associated with the content provider 105.

To provide for payment to the user, the content processor 107 may store information from the electronic record and provide for payments to be made to the user of the portable media device 120. The content processor 107 may also collect information from the electronic record concerning the user of the second portable media device from which data concerning the distribution of the media content may be ascertained and the demographics of consumers receiving the media content interpreted. The content provider 105 may use distribution information received by the content processor 107 for marketing purposes and/or negotiations with advertisers.

Figure 2:
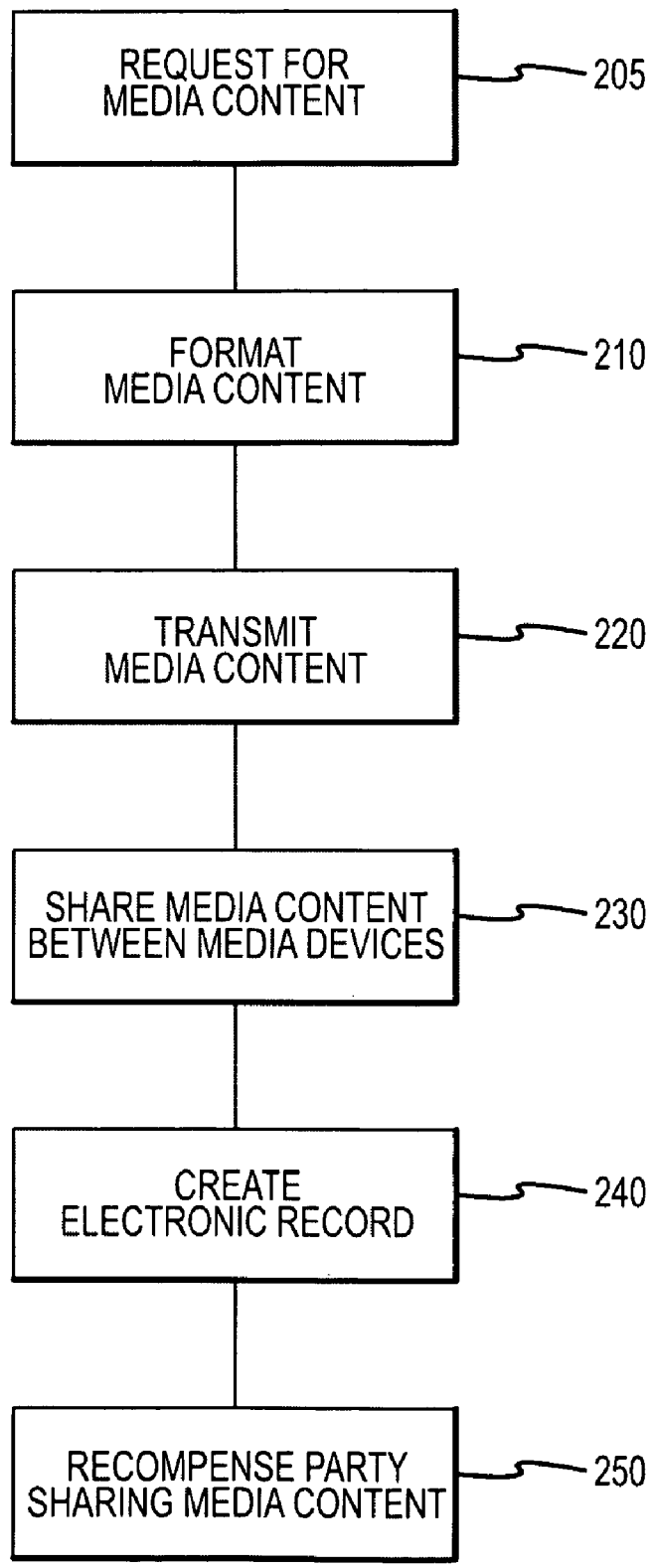
FIG. 2 is a flowchart illustrating a method for distributing media content between portable media devices, in accordance with an embodiment of the present invention.

FIG. 2 is a flowchart illustrating a method for distributing media content between portable media devices, in accordance with an embodiment of the present invention. In the first step 205, a user of a first portable media device may send a request to a content provider or a party operating a network making media content available for media content. As discussed previously, the provider of the media content may be a party that operates a network for portable media devices, such as a wireless phone network operator, and obtains media content from media content providers to supply to the wireless phone network operator's clients. In step 210, one or more processors may be used to obtain, format, compress, etc. the media content for delivery to the user (e.g., an NPVR, a ROD server and/or a media conversion server, each of which is described in further detail in the NPVR Applications, may be configured to provide such services.) In certain aspects, the media content may be formatted for transmission to a portable media device and/or an associated device capable of capturing the media content for the portable media device. In other aspects, marketing materials and/or content may be inserted into the media content, as described in the NPVR Applications, for example. In some cases, this marketing content may be selected based upon a profile of the user stored in a memory associated with the processor. In yet further aspects, digital rights management protocols and/or the like may be associated with the media content to provide protections for the content provider.

In step 220, media content is transmitted to a portable media device from the content provider (e.g., via an NPVR, subscriber connectivity device and/or other appropriate device). The media content may be transmitted over a network, such as the Internet, or the like. Once received, the media content may be stored on the portable media device. In certain aspects, the media content may be transmitted to a device associated with the portable media device, such as a base station, before being transferred to the portable media device.

In step 230, media content from the portable media device may be transmitted to a second portable media device. In certain aspects transmission from one portable media device to another portable media device may be performed wirelessly using Blue tooth technology, WiFi technology, infrared technology, and/or the like. In alternative aspects a hard connection may be made between the portable media devices to provide for the transfer of the media content.

In step 240, an electronic record of the transmission may be created by the portable media device receiving the media content. The electronic record may include the identity of the portable media device receiving the media content, information concerning a user or users of the portable media device, etc. In step 250, the electronic record is communicated to the content provider (and/or some party associated therewith). In some embodiments, the electronic record may be communicated to the portable media device that shared the media content with the receiving portable media device. In such embodiments, the user of the sharing portable media device may communicate the electronic record to the content provider or a party distributing the content provider's content to register the distribution of the media content by the user. In other embodiments, the electronic record may be communicated over a network to the content provider or to a party distributing content for the content provider.

In step 250, in certain embodiments of the present invention, the content provider and/or a person associated with the content provider may provide some form of recompense to the user of the portable media device who distributed the media content from their portable media device to a second portable media device. Recompense may be monetary, access to additional media content and/or the like.

Figure 3:
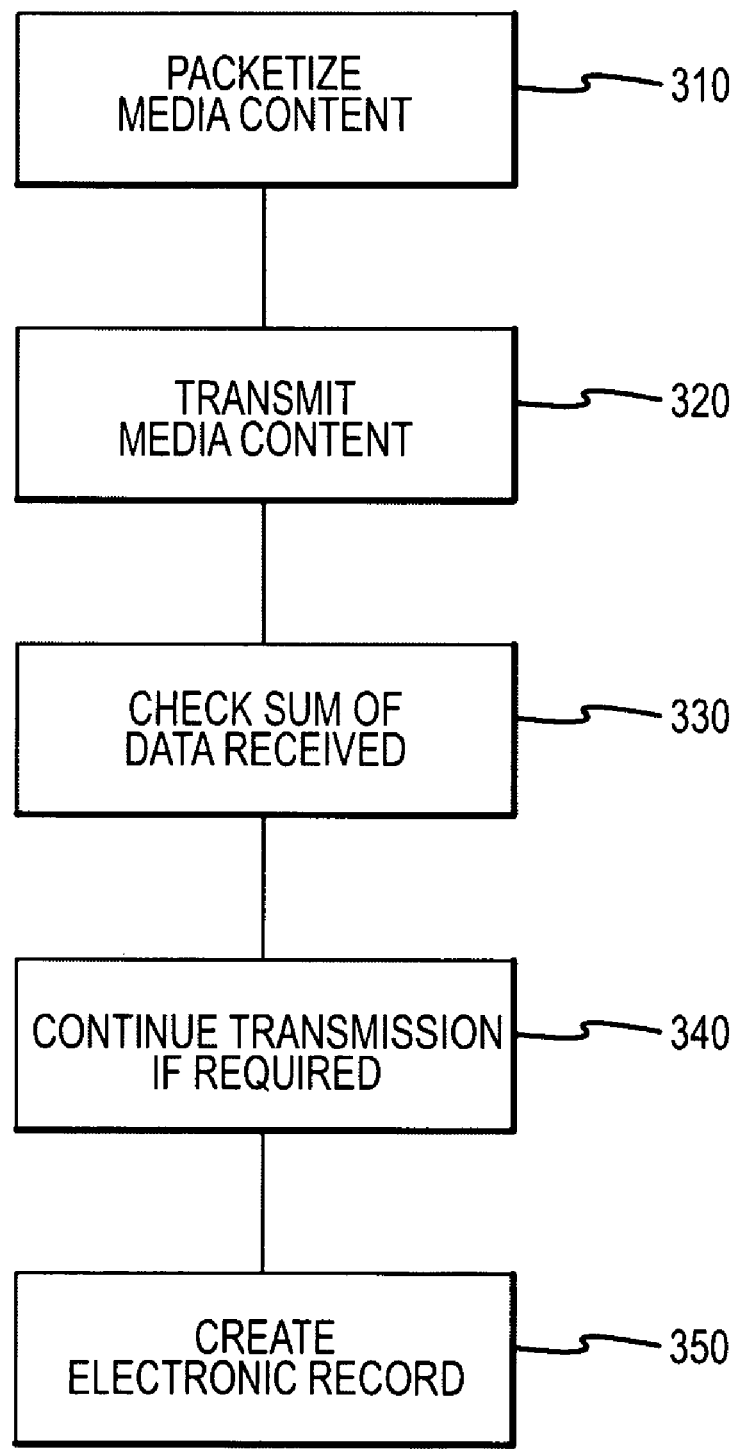
FIG. 3 is a flow-type schematic illustrating the transmission of data between portable media devices in accordance with an embodiment of the current invention.

FIG. 3 is a flow-type schematic illustrating the transmission of data between portable media devices in accordance with an embodiment of the current invention. In certain embodiments of the present invention data may be packetized and transmitted in packets between portable media devices. In step 310 a processor associated with a first portable media device may identify data for sharing with a second portable media device, according to user commands or the like. The processor, after selection, may format the data into a plurality of data packets.

In step 320, the data packets may be communicated by the first portable media device and/or a device associated with the first portable media device to a second portable media device and/or a device associated with the second portable media device. Transmission may be by wireless communication means, via a hard connection and or a network. At the beginning of the communication a checksum may be sent to the second portable media device. In step 330, a processor associated with the second portable media device may perform a checksum type analysis and compare the amount of packets of data received or the like with the checksum.

In step 340, if the processor determines that not all of the data packets have been received it may send a signal to the first portable media device to request either continuation of an interrupted data transmission and/or a complete resending of the data packets. In certain embodiments, the packets of data may contain information so that the processor may be able to identify the missing packets and request the transmission of the missing data packets. In certain embodiments, multiple communication networks, devices and/or the like may be used to transmit the data between the portable media devices and the processor may reconstruct the media content from the data packets received. In step 350, an electronic record of the communication of the data packets between the portable media devices may be created by a processor associated with one of the portable media devices. The electronic record may include identification of the data packets sent and identification that all packets were successfully transmitted and received.

It should be noted that the methods, systems and devices discussed above are intended merely to be exemplary in nature. Consequently, various embodiments may omit, substitute and/or add various procedures and/or components as appropriate. For instance, it should be appreciated that in alternative embodiments, the methods may be performed in an order different than that described.

It should also be appreciated that the methods described above may be performed by hardware components and/or software programs, and thus may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as an NPVR, ROD server, MCS, etc.). Alternatively, the methods may be performed by a combination of hardware and software.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for disseminating media content between portable media devices, the method comprising:
   transferring media content from a first portable media device to a second portable media device, wherein:
   the first portable media device is associated with a first user;
   the media content is processed for transfer and subsequently transferred from the first portable media device to the second portable media device upon selecting the media content for transfer user, wherein processing the media content comprises:
   formatting the media content for the second portable media device;
   applying or maintaining digital rights management controls to the media content;
   applying a signature identifying the content provider; and
   applying a signature identifying the first portable media device; and
   the second portable media device is associated with a second user;
   transmitting, from the second portable media device directly to the first portable media device, a first electronic record comprising information about the reception of the media content by the second portable media device and identifying the media content and a user of the second portable media device; and
   providing a second electronic record to a content provider from the first portable media device, the second electronic record comprising the first electronic record.

2. A method as recited by claim 1, wherein the first user and the second user are the same user.

3. A method as recited by claim 1, further comprising:
   billing the second user for the transferred media content.

4. A method as recited by claim 1, further comprising:
   providing recompense to the first user.

5. A method as recited by claim 4, wherein the recompense is monetary.

6. A method as recited by claim 1, wherein the media content comprises marketing content that includes advertisements.

7. A method as recited by claim 1, wherein:
   the media content is transferred wirelessly from the first portable media device to the second portable media device.

8. A method as recited in claim 7, further comprising:
   converting the media content into a plurality of packets of information; and
   determining that each of the plurality packets of information is transferred from the first portable media device to the second portable media device.

9. The method of claim 1 wherein, the information is further adapted to create a demographic profile of at least one of the first user, the second user, and other consumers receiving the media content.

10. The method of claim 7 wherein, the wireless media is transferred wirelessly over a personal broadcast channel.

11. The method of claim 1 wherein, the second electronic record,
   is received by a content processor;
   identifies the distribution of the media content; and
   requests authorization to transfer the content.

12. The method of claim 1, wherein the media content comprises streaming media content.

13. A system for disseminating media content between portable media devices, comprising:
   a media content transmitter coupled with a first portable media device and configured to process and transmit a selection of the media content for transfer from the first portable media device being made by a first user associated with the first portable media device, wherein processing the media content comprises:
   formatting the media content ready for a second portable media device;
   applying or maintaining digital rights management controls to the media content;
   applying a signature identifying the content provider; and
   applying a signature identifying the first portable media device;
   a media content receiver coupled with the second portable media device and configured to receive the media content;
   a reception processor coupled with the second portable media device and configured to process the reception of the media content and to create a first electronic record comprising information about the reception of media content by the second portable media device, the first electronic record identifying the media content and a user of the second portable media device and adapted to be sent to the first portable media device from the second portable media device;
   a first communication port coupled with the second portable media device and configured to transmit the first electronic record directly from the second portable media device to the first portable media device; and
   a second communication port coupled with the first portable media device and configured to transmit a second electronic record to a content provider, the second electronic record comprising the first electronic record.

14. A system as recited by claim 13, wherein the second communication port is configured to transmit the electronic record to a content provider.

15. A system as recited by claim 13, further comprising:
   a billing processor associated with the content provider and configured to process the electronic record and bill a user associated with the second portable device for the media content transfer.

16. A system as recited by claim 13, wherein the electronic record comprises at least one of a user identification for the user, a credit card identifier for a credit card associated with the user, an account identifier for an account of the user with the media provider and a billing address.

17. A system as recited by claim 13, wherein:
the second communication port is configured to receive the first electronic record from the second portable media device.

18. A system as recited by claim 17, wherein the first portable media device is configured to determine, based on the first electronic record, whether the second portable media device is authorized to receive the media content.

19. A system as recited by claim 17, wherein the first portable media device is configured to:
transmit the media content to the second portable media device; and
create the second electronic record.

20. A system as recited by claim 19, wherein the second electronic record comprises an identification of the media content.

21. A system as recited by claim 17, wherein the first portable media device is configured to:
transmit the second electronic record to the media content provider in order to determine whether the second portable media device is authorized to receive the media content.

22. A system as recited by claim 13, wherein the first and second portable media devices comprise wireless phones.

23. A system as recited by claim 13, wherein at least one of the transmitter and receiver comprises an infra-red.

24. A system as recited by claim 13, wherein at least one of the receiver and transmitter comprises one of a WiFi and a WiMax.

25. The system of claim 13, wherein the media content comprises streaming media content.

26. The system of claim 13, wherein the media content comprises marketing content.

27. A method for disseminating media content between portable media devices, comprising:
sending a request for media content from a first portable media device to a media content provider;
providing the requested media content from the media content provider to the first portable media device;
processing the media content at the first portable media device upon selection of the media content for transfer, wherein processing the media content comprises:
formatting the media content for a second portable media device;
applying or maintaining digital rights management controls to the media content;
applying a signature identifying the content provider; and
applying a signature identifying the first portable media device;
transferring the media content from the first portable media device to the second portable media device upon a selection of the media content for transfer by a first user associated with the first portable media device, wherein the second portable media device is associated with a second user;
creating on the second portable media device a first electronic record comprising information about the reception of the media content by the second portable media device, the first electronic record identifying the media content and a user of the second portable media device and adapted to be sent to the first portable media device from the second portable media device;
transmitting the first electronic record directly from the second portable media device to the first portable media device; and
providing a second electronic record to the content provider from the first portable media device to the content provider, the second electronic record comprising the first electronic record.

28. The method of claim 27, wherein the media content comprises streaming media content.

29. The method of claim 27, wherein the media content comprises marketing content.

* * * * *